(12) United States Patent
Morozov (10) Patent No.: US 6,384,958 B1
(45) Date of Patent: May 7, 2002

(54) FREE-SPACE THERMO-OPTICAL DEVICES

(75) Inventor: Val Morozov, San Jose, CA (US)

(73) Assignee: JDS Uniphase Corporation, San Jose, CA (US)

( * ) Notice: Subject to any disclaimer, the term of this patent is extended or adjusted under 35 U.S.C. 154(b) by 56 days.

(21) Appl. No.: 09/603,789

(22) Filed: Jun. 26, 2000

(51) Int. Cl.[7] .................................................. G02F 1/01
(52) U.S. Cl. ................................................ 359/288
(58) Field of Search .................. 385/16, 22, 18–26, 385/147; 359/288; 345/106

(56) References Cited

U.S. PATENT DOCUMENTS

| | | | |
|---|---|---|---|
| 3,704,935 A | * 12/1972 | Boer | 359/315 |
| 6,246,809 B1 | * 6/2001 | Jouanno et al. | 385/22 |
| 6,256,428 B1 | * 7/2001 | Norwood et al. | 385/17 |

OTHER PUBLICATIONS

Journal of Lightwave Technology, vol. 7, No. 3, Mar. 1989 pp. 449–453 "Polymeric Optical Waveguide Switch" by M.B.J. Diemeer et al.*

* cited by examiner

*Primary Examiner*—Georgia Epps
*Assistant Examiner*—William Choi
(74) *Attorney, Agent, or Firm*—Lacasse & Associates, LLC

(57) ABSTRACT

A thermo-optical device to alter the direction and/or intensity of a light beam is described. In the thermo-optical device, a first material in contact with a second material defines an interface therebetween. The first and second materials have disparate thermo-optical coefficients such that, at a first temperature, the refractive indices of the two materials are the same and, at a second temperature, the refractive index of one material is less than the refractive index of the other material. At the first temperature, when the two refractive indices are equal, a light beam incident on the interface is transmitted through the interface without refraction. At the second temperature, the light beam propagating through one of the material, if incident on the interface at an appropriate angle, will be reflected off, instead of transmitted through, the interface.

47 Claims, 8 Drawing Sheets

FREE-SPACE THERMO-OPTICAL DEVICES

FIELD OF THE INVENTION

The present invention relates to the manipulation of optical signals and, more particularly, to thermally-induced free-space optical switching.

BACKGROUND

Switches are needed in optical communications networks for, e.g., routing optical signals. Several types of optical switches have been proposed, each with its own set of advantages and disadvantages.

Mechanical switches, such as those with a moving prism and lens, have small wavelength dependent loss, low loss, and operate in free-space, but are complex, expensive to manufacture, and questionable long-term reliability.

Several integrated optical switches, which take advantage of integrated semiconductor fabrication techniques, have been proposed. Typically, in such integrated optical switches, waveguides are formed on a substrate and a change in refractive index of the waveguide material is induced to control light switching. Such integrated optical switches have several drawbacks. Integrated optical switches based on an electro-optical effect or electromagnetic effect are polarization dependent and usable only for single-mode light. Switches that rely upon refractive index changes induced by injection of charge carriers suffer from high losses due to carrier absorption.

Regardless of the mechanism by which the change in refractive index is induced, integrated optical switches require light to be coupled first into a waveguide. Such waveguides are typically on the order of 10 µm or less in width, making the coupling of light into an integrated optical switch a non-trivial procedure.

SUMMARY OF THE INVENTION

The present invention provides an optical device that employs thermally induced total internal reflection to alter a light beam propagating in free-space without using moving parts. The thermo-optical device of the present invention has a first material having a first refractive index and a second material having a second refractive index. The first and second materials are in contact with each other to form an interface. At a first temperature, the second refractive index is substantially equal to the first refractive index, and the light beam is transmitted through the interface. At a second temperature at which the second refractive index is different than the first refractive index, at least some of the light beam is reflected at the interface.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

The thermo-optical devices described herein rely upon a thermally induced change in refractive index (i.e., a thermo-optical effect) to alter the direction and/or intensity of a light beam propagated in free space. Thermo-optical devices as described herein may be used as optical switches and/or optical attenuators. The present invention will be described below in connection with the Figures and with certain embodiments. Neither the Figures nor the descriptions below are intended to limit the present invention.

Thermo-optical devices herein combine two materials having different thermo-optical coefficients. The two materials, which may be of similar or different chemical compositions, are contacted with each other to define an interface therebetween. At a first temperature, the refractive indexes of the two materials are substantially the same, and a light beam propagating through the first material will be transmitted without substantial refraction through the interface. As the materials are heated, because of the different temperature dependencies of the refractive indexes, the refractive index of one material will decrease at a faster rate than that of the other material. At a second temperature higher than the first temperature, the refractive index of one of the material is less than the refractive index of the other material, and at least part of a light beam propagating through the material with the higher refractive index, if incident on the interface at an appropriate angle, will be reflected at, instead of transmitted through, the interface and back into the material with the higher refractive index.

In this way, the direction of a light beam can be altered, or switched, without having to couple and propagate the light through a waveguide channel. The intensity of the light beam also can be altered, or attenuated, using the thermo-optical effect as described above. The thermo-optical free-space switches and thermo-optical attenuators described herein do not use moving parts to alter direction or intensity of the light beam and may be manufactured using integrated fabrication techniques known in the art.

Figure 1A:
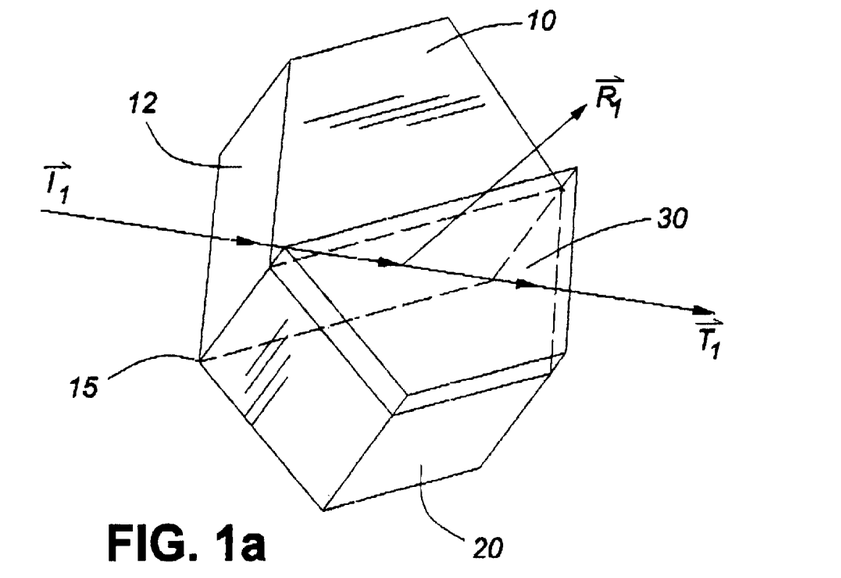
FIGS. 1a and 1b illustrate two views of one embodiment of a thermo-optical device.
Figure 1B:
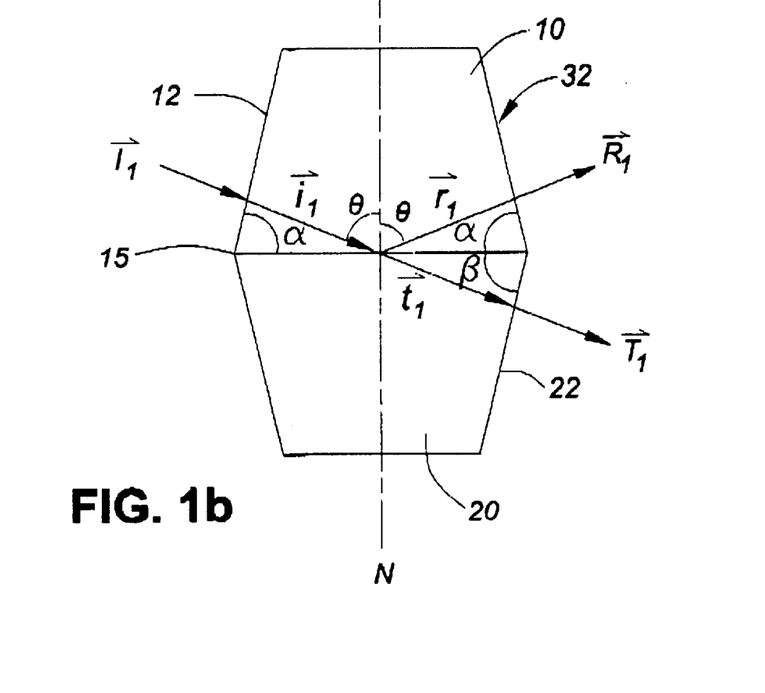

FIGS. 1a and 1b depict one embodiment of a thermo-optical device according to the present invention. A first material 10 having a first refractive index ($n_1$) is contacted with a second material 20 having a second refractive index ($n_2$) such that an interface 15 is defined therebetween. In one embodiment and as shown in FIGS. 1a and 1b, the interface is a planar interface. The first and second materials are chosen to have disparate thermo-optical coefficients ($dn_i/dT$, where $n_i$ is refractive index (i=1,2) and T is temperature). As described herein, the second material has a larger thermo-optical coefficient than the first material, though the present invention also encompasses thermo-optical devices where the first material has a larger thermo-optical coefficient that the second material.

It should be noted that the thermo-optical coefficient (dn/dT) is negative, meaning that refractive index decreases as temperature increases. When the second material is described as having a larger thermo-optical coefficient than the first material, what is meant is that $n_2$ has a greater dependence on temperature than $n_1$ such that, as the temperature is increased, $n_2$ will decrease more than $n_1$.

In the embodiment shown in FIGS. 1a and 1b, a heater 30, e.g., a metallic layer or film or strip connected with a power supply (not shown), is formed in thermal contact with at least the second material 20 (i.e., the material having the larger thermo-optical coefficient). The heater serves to heat at least the second material from a first temperature to a second temperature, typically raising the temperature of the second material between about 20° C. and about 50° C. The heater 30 may be formed by various techniques, such as vacuum deposition, evaporation, sputtering, etching, photolithography, etc., and may be made of any material known for use as such, e.g., Ni—Cr, chromium, silver, titanium, tantalum, metal, metal alloys, etc. Though shown in FIG. 1a as formed over the second material, the heater may be formed only partially over the second material, e.g., only along the interface, or over both the first material and the second material, or in other configurations that allow the thermo-optical device to function as described herein.

At a first temperature, $n_2$ is substantially equal to $n_1$ ($n_2=n_1$). A light beam incident on a surface of the first material 10 (shown by $\vec{I}_1$) and propagated through the first material 10 (shown by $\vec{t}_1$) is transmitted through the interface 15 and is propagated through the second material 20 (shown by $\vec{t}_1$). The light beam then exits as a transmitted beam (shown by $\vec{T}_1$). In one embodiment, the first temperature is room temperature, or ambient temperature. Because $n_2=n_1$, the light beam is not refracted at the interface 15 and the light beam is propagated through the second material 20 in the same direction as through the first material 10.

At a second temperature higher than the first temperature, $n_2$ is less than $n_1$ ($n_2<n_1$) because of the disparate thermo-optical coefficients of the first material and the second material. With $n_2<n_1$ and if the light beam is incident on the interface 15 at an appropriate angle of incidence, θ (measured from the normal (N) to the interface 15), at least some of the light beam is reflected off, instead of transmitted through, the interface 15 (as shown by $\vec{r}_1$). The angle of incidence, θ, must be greater than a critical angle, $θ_c$, which is based on Snell's Law for an angle of refraction of 90° and given by the formula:

$$\sin θ_c = \frac{n_2}{n_1}\sin 90° = \frac{n_2}{n_1}.$$

At the second temperature, if the light beam is incident on the interface 15 at an angle of incidence, θ, greater than $θ_c$ (i.e., $θ>θ_c$), at least some of the light beam is reflected off the interface 15 (as shown by $\vec{r}_1$) and exits from the first material 10 as a reflected beam (shown by $\vec{R}_1$).

As discussed above, the first and second materials are chosen to have (1) substantially the same refractive indices at a first temperature and (2) disparate thermo-optical coefficients such that at a second temperature greater than the first temperature, the second refractive index is different (less or greater) than the first refractive index. In one embodiment, the first refractive index is between about 1.3 and about 1.6 at the first temperature, and more typically between about 1.4 and about 1.5 at the first temperature. In one embodiment, the second material has a thermo-optical coefficient at least one order of magnitude different than the first material. In another embodiment, the material with the larger thermo-optical coefficient has a thermo-optical coefficient of at least $10^{-4}/°$ C. At the second temperature, the first and the second refractive indices in one embodiment differ by at least 0.001. In another embodiment, the first and the second refractive indices differ by at least 0.002 at the second temperature.

The material having the smaller thermo-optical coefficient may include an optical glass. Most optical glasses are doped silica-based glass. Optical glasses typically have a refractive index between about 1.4 and about 2.0, and most optical glasses have a thermo-optical coefficient on the order of about $10^{-5}/°$ C. or less. It is known how to form, deposit, pattern, and shape optical glasses, particularly silica-based glasses, e.g., on a substrate.

The material having the larger thermo-optical coefficient may include an optical polymer. One feature of optical polymers is that the properties of the polymer, such as refractive index, thermal stability, etc., may be precisely tailored by controlling the polymer's composition. Thus, the refractive index of an optical polymer may be tailored to be the same as the refractive index of an optical glass at a first temperature. Most optical polymers have a refractive index between about 1.3 and about 1.6. Some optical polymers have a thermo-optical coefficient between about $-1 \times 10^{-4}/°$ C. and about $-3 \times 10^{-4}/°$ C.

The optical polymer may be a pairwise miscible polymer or a cross-linked polymer, and may include an acrylate, such as a partially halogenated acrylate or a polymethyl methacrylate, or other type of polymer.

The thermo-optical device shown in FIGS. 1a and 1b may be used as a 1×2 free-space optical switch to alter a light beam propagating in free-space from a first direction to a second direction. A light beam propagating in free-space along a first direction towards the thermo-optical device is incident on an entry surface 12 of the first material 10 (as shown by $\vec{I}_1$). To reduce, and maybe even minimize, reflection of the light beam off the entry surface 12, in one embodiment the light beam is incident on the first material 10 at an angle normal to the entry surface 12 (in terms of Snell's Law, the incident angle measured from the normal is 0°). In another embodiment, the entry surface 12 is coated with an anti-reflection coating.

In one embodiment, the first material is shaped with a prism angle, α, as shown in FIG. 1b. If the light beam hits the first material 10 normal to the entry surface 12, from Snell's Law, the light beam will not be refracted at the entry surface and will propagate in the first material along the first direction (shown by $\vec{i}_1$). It can be seen from the geometry that a light beam incident normal to the entry surface 12 and propagating through the first material 10 along the first direction will be incident at the interface 15 at an angle of incidence, θ, that is equal to the prism angle, α (θ=α). As discussed above, for the light beam to be reflected off the interface 15 at the second temperature, the angle of incidence, θ, must be greater than the critical angle, $θ_c$, at the second temperature. Accordingly, the prism angle, α, is given by:

$$α = θ > θ_c = \sin^{-1}\left(\frac{n_2}{n_1}\right), \quad \text{at the second temperature.}$$

Regardless of whether the light beam is incident normal on the entry surface 12, the light beam propagates through the first material 10 and is incident on the interface 15 at an angle of incidence, θ. At the first temperature, $n_1=n_2$ and the light beam is transmitted without substantial refraction through the interface 15 and so continues to travel through the second material along the first direction (as shown by $\vec{t}_1$). The light beam eventually exits the device as a transmitted beam ($\vec{T}_1$).

In one embodiment, the thermo-optical device depicted in FIGS. 1a and 1b is transparent to the light beam at the first temperature. In other words, the light beam propagating in free-space along the first direction is incident on the device ($\vec{I}_1$) and then exits from the device ($\vec{T}_1$) still travelling along the first direction (as shown by $\vec{T}_1$) without having been significantly refracted or shifted. If exiting normal to an exit surface 22 of the second material, the light beam will not be refracted upon exiting the device and will continue to travel along the first direction. The geometry, which can be seen in FIG. 1b, shows that the second material having a second prism angle, β, equal to the prism angle of the first material, α, (α=β) will result in the light beam being incident normal to the second material's exit surface 22.

Figure 2A:
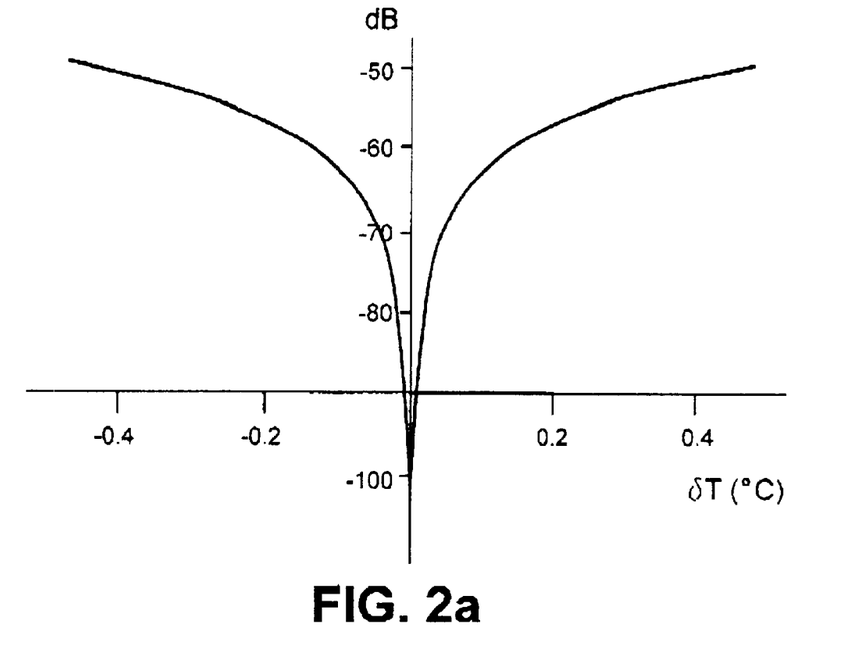
FIGS. 2a and 2b contain graphs showing the expected cross talk for the TE and TM modes, respectively, with a thermo-optical device as a function of temperature deviation from the first temperature.
Figure 2B:
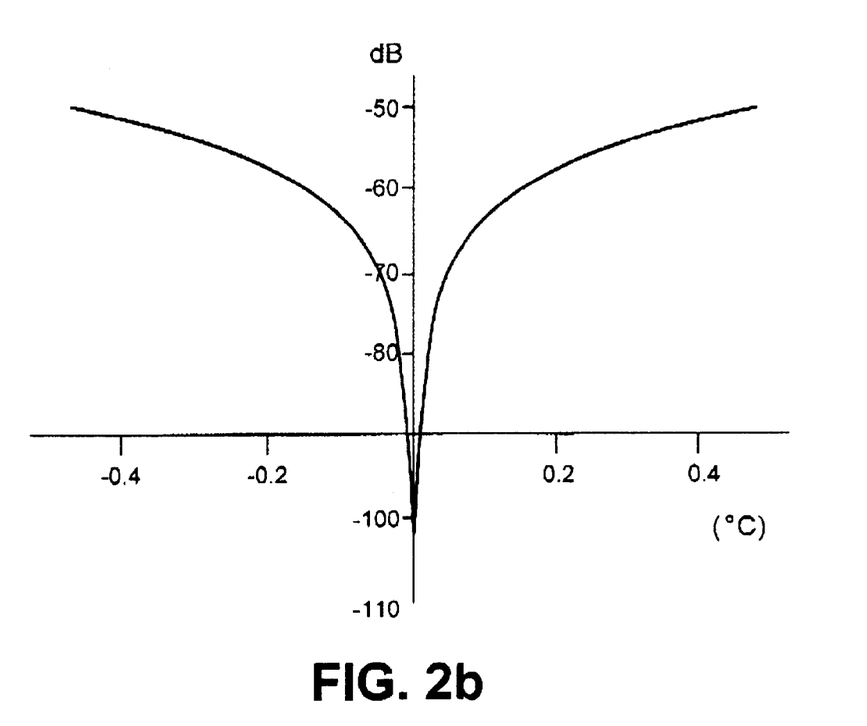

FIGS. 2a and 2b show the expected amount of cross talk, or residual reflection, at the interface for the transverse electric (TE) and the transverse magnetic (TM) modes of the light beam, respectively, as a function of temperature deviation from the first temperature. Cross talk is defined as $$10 \log \left[\frac{I(\vec{R}_1)}{I(\vec{T}_1)}\right],$$

where $I(\vec{R}_1)$ is the intensity of the reflected beam, $\vec{R}_1$, and $I(\vec{t}_1)$ is the intensity of the transmitted beam, $\vec{t}_1$. As δT →0, the amount of cross talk drops off rapidly and essentially all of the light beam is transmitted through the interface. At temperature deviations of up to about ±0.5° C., the amount of cross talk is still fairly small, with only about $10^{-5}$ of the transmitted beam being reflected off the interface. Thus, thermo-optical devices described herein are expected to have good transmission tolerances at the first temperature.

When the thermo-optical device is heated to the second temperature, $n_2 \ne n_1$, and at least some of the light beam is reflected off the interface 15 and propagates through the first material along a second direction (as shown by $\vec{r}_1$). The light beam then exits the device as a reflected beam (shown by $\vec{R}_1$). In FIG. 1b, the geometry shows that the light beam propagated along the second direction in the first material 10 ($\vec{r}_1$) will be incident normal on an exit surface 32 of the first material 10. Thus, the light beam will not be refracted at the first material's exit surface 32, and the reflected beam exiting the device ($\vec{R}_1$) will continue to travel along the second direction. In this way, the thermo-optical device shown in FIGS. 1a and 1b can function as a 1×2 optical switch.

Figure 3A:
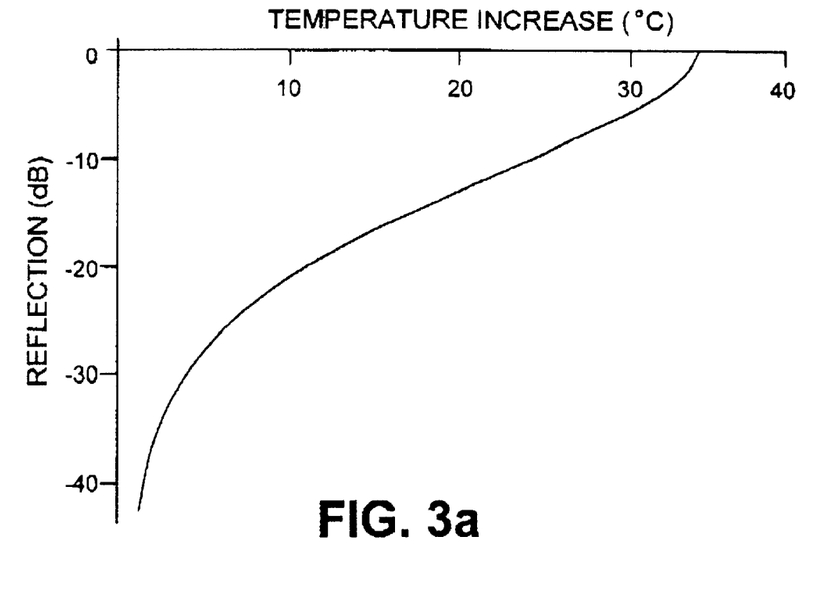
FIGS. 3a and 3b contain graphs showing the expected reflection behavior for the TE and TM modes, respectively, of a thermo-optical device as a function of increasing the temperature from the first temperature to the second temperature.
Figure 3B:
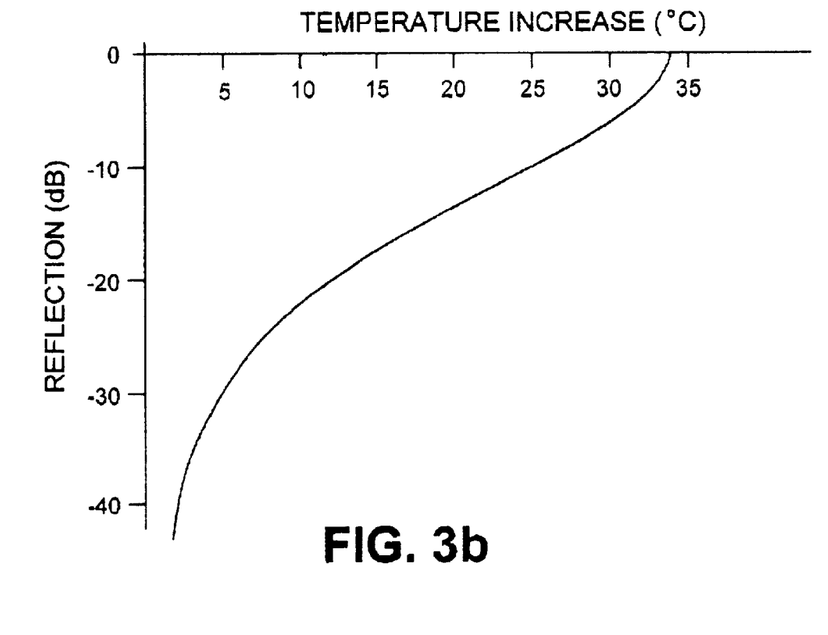

The graphs in FIGS. 3a and 3b show the expected reflection behavior of a thermo-optical device described herein where the larger thermo-optical coefficient ($dn_i/dT$) is $-2.5 \times 10^{-4}$/° C. FIGS. 3a and 3b show the reflection of the TE and TM modes of the light beam, respectively, as temperature increases from the first temperature to the second temperature. Reflection is defined as $$10 \log \left[\frac{I(\vec{R}_1)}{I(\vec{I}_1)}\right],$$

where $I(\vec{R}_1)$ is the intensity of the reflected beam, $\vec{R}_1$, and $I(\vec{I}_1)$ is the intensity of the incident beam, $\vec{I}_1$. Reflection of 0dB means total internal reflection occurs and all of the light beam is reflected off the interface, i.e., $I(\vec{R}_1)=I(\vec{I}_1)$, and none of the light beam is transmitted At reflection below −40 dB, essentially none of the light beam is reflected, i.e., $I(\vec{R}_1)<10^{-4} \times I(\vec{I}_1)$, and essentially all of the light beam is transmitted through the interface.

As can be seen from FIGS. 3a and 3b, reflection increases gradually as temperature is increased. Where the second temperature is about 34° C. greater than the first temperature, total internal reflection occurs, and all of the light beam is reflected off of the interface. Where the temperature difference between the second temperature and the first temperature is smaller than about 34° C., only part of the light beam is reflected, with the remainder of the light beam being transmitted through the interface. Thus, a thermo-optical device according to the present invention also may be used an optical attenuator, splitting off part of the light beam into a reflected beam while transmitting the remainder of the light beam as a transmitted beam.

The temperature difference at which total internal reflection occurs (i.e., reflection =0 dB) depends upon the difference in thermo-optical coefficients between the first material and the second material. Generally, given the range of thermo-optical coefficients for typical optical materials, the second temperature will be at least 20° C. different than the first temperature, with a temperature difference between about 30° C. and about 50° C. being more typical, to induce in total internal reflection of the light beam in a thermo-optical device.

Figure 4:
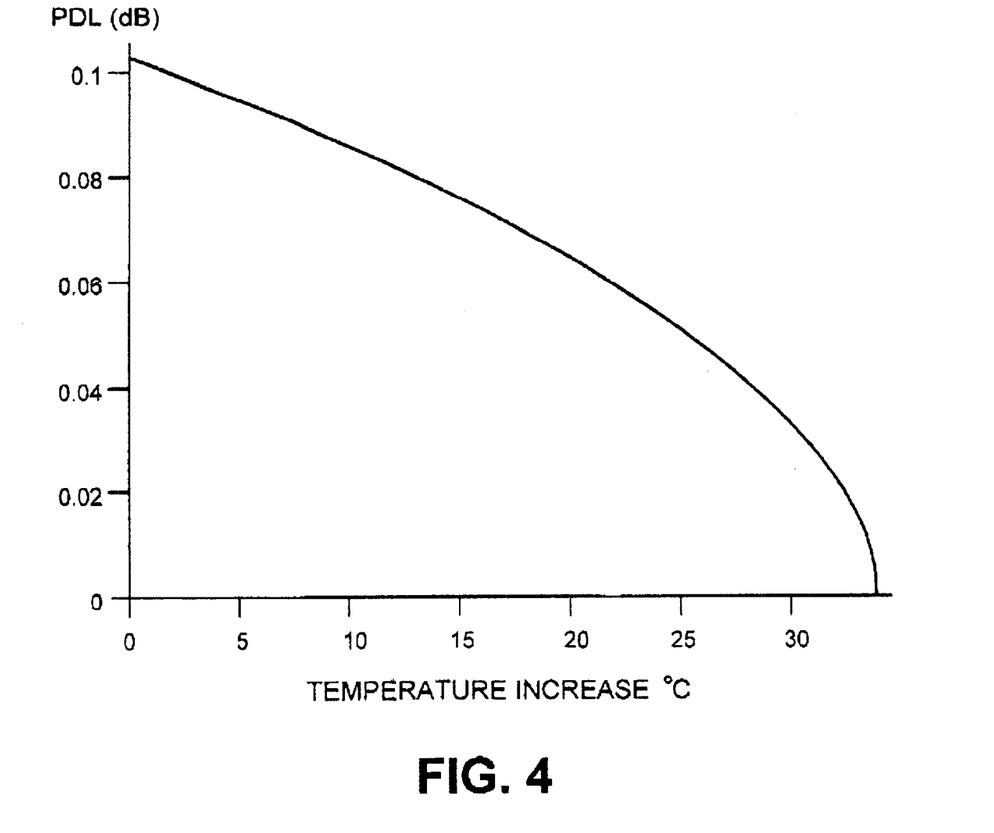
FIG. 4 shows a graph of the expected polarization dependent loss in a thermo-optical device as a function of increasing the temperature from the first temperature to the second temperature.

FIG. 4 shows the expected polarization dependent loss (PDL) performance of a thermo-optical device according to the present invention as a function of increasing the temperature from the first temperature to the second temperature. fib PDL is defined as $$10 \log \left[\frac{I(R_{TE})}{I(R_{TM})}\right],$$

where $I(R_{TE})$ is the intensity of the TE mode of the reflected beam, $\vec{R}_1$, and $I(R_{TM})$ is the intensity of the TM mode of the reflected beam. At a second temperature about 34° greater than the first temperature, total internal reflection occurs, and the TE and TM modes of the light beam are reflected equally off the interface, i.e., $I(R_{TE}) = I(R_{TM})$. Even at the first temperature (i.e., temperature increase =0°), PDL is only about 0.1. Thus, in one embodiment, the thermo-optical device is expected to have low polarization dependence and good polarization dependence loss characteristics.

Figure 5:
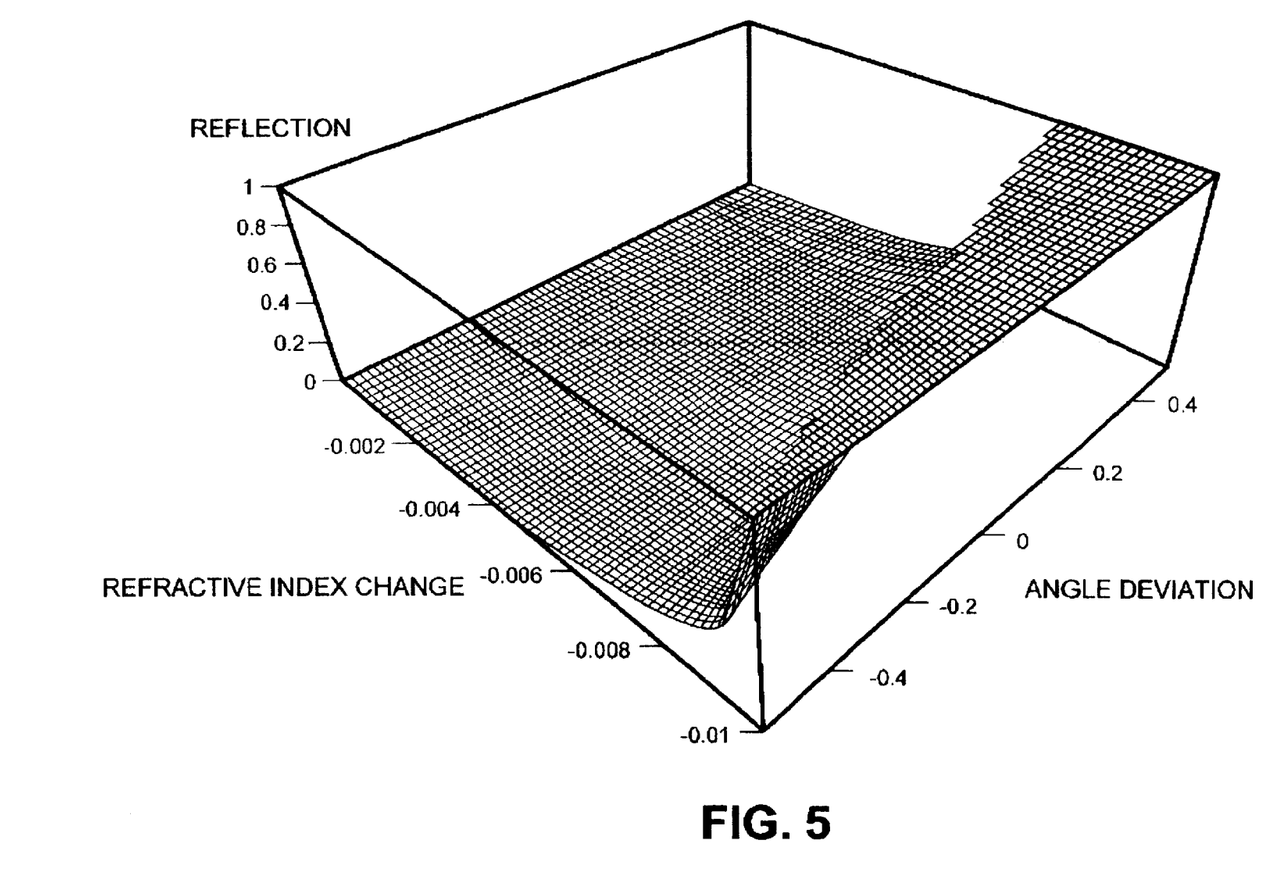
FIG. 5 illustrates the operational tolerances of a thermo-optical switch.

FIG. 5 graphically illustrates the expected operational tolerances of a thermo-optical switch described herein. The reflection tolerances are modeled for angle of incidence on the interface (±δθ=(θ±δθ)−θ_c) and refractive index change (Δn =$n_2-n_1$). The refractive index change in turn is related to the difference between the second temperature and the first temperature (ΔT) by the equation $n_{i,T2}=n_{i,T1}+(dn_i/dT)\Delta T$, where $n_{i,T2}$ is the refractive index at the second temperature and $n_{i,T1}$ is the refractive index at the first temperature (i=1,2). Reflection (defined as $$\frac{I(\vec{R}_1)}{I(\vec{i}_1)})$$

equal to 1 corresponds to total internal reflection at the interface.

From the graph in FIG. 5, it can be seen that deviation of the angle of incidence between about ±0.5° corresponds to a refractive index change between about −0.007 and about −0.01. For a thermo-optical coefficient ($dn_i/dT$) of $-2.5 \times 10^{-4}/°$ C., this in turn corresponds to a temperature change in a range between about 28° C. and about 40° C. Accordingly, to compensate for possible deviations in the angle of incidence, a second temperature at least 40° C., more typically between about 40° and about 50° C., different than the first temperature is expected to ensure total internal reflection of the light beam at the second temperature.

As demonstrated above, when the light beam is incident normal to the entry surface, the angle of incidence on the interface, θ, equals the prism angle, α, of the first material (θ=α). Thus, the graph in FIG. 5 also models the expected reflection tolerance for the prism angle (±δα), and gives the correspondence between the manufacturing tolerances for the prism angle and the second temperature of one embodiment of a thermo-optical device.

Figure 6A:
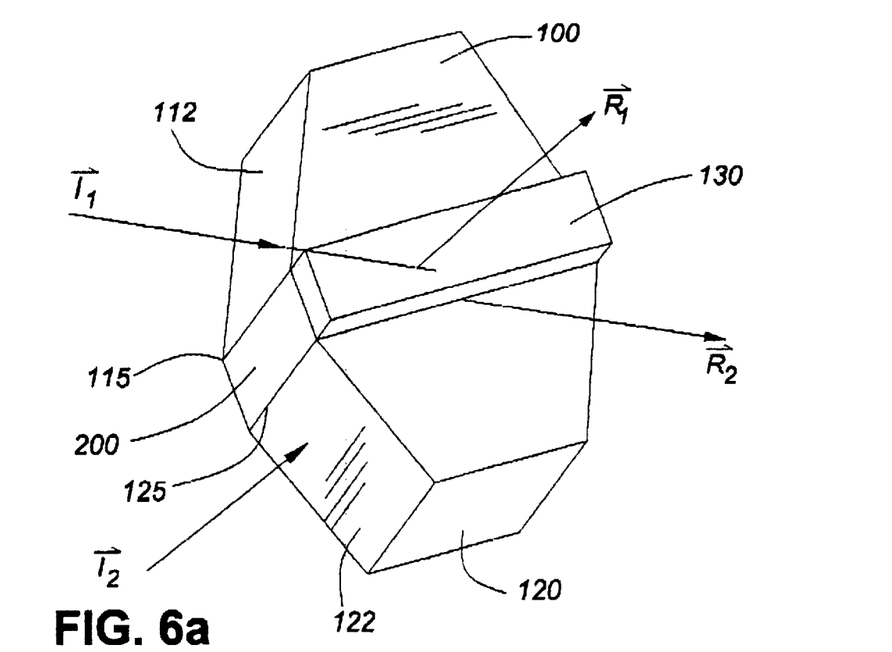
FIGS. 6a and 6b illustrate two different views of another embodiment of a thermo-optical device.
Figure 6B:
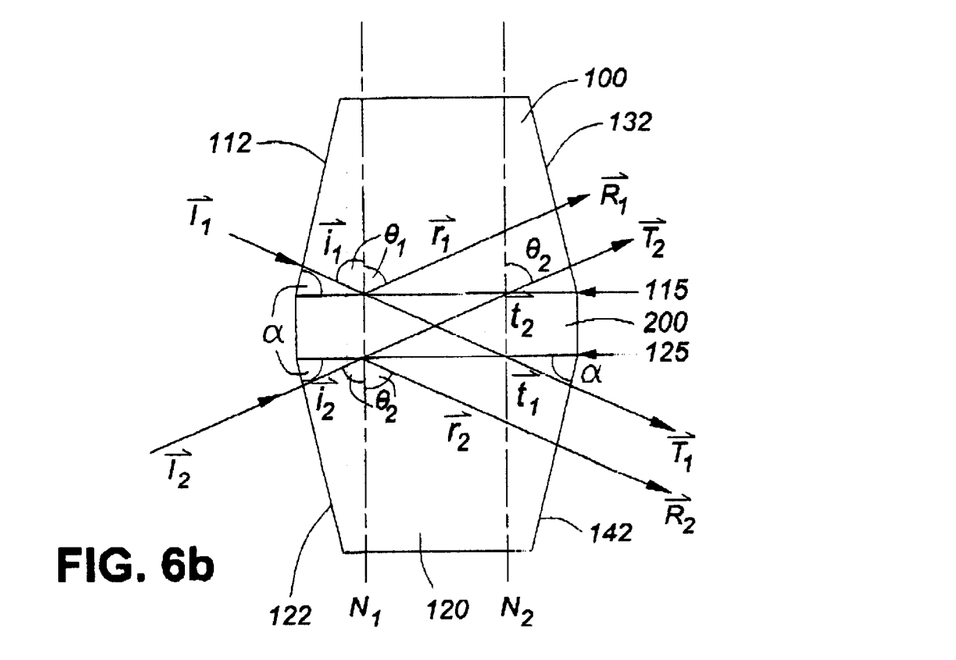

FIGS. 6a and 6b show another embodiment of a thermo-optical device according to the present invention. This embodiment has a first layer of a first material 100 having a first refractive index ($n_1$), a layer of a second material 200 having a second refractive index ($n_2$), and a second layer of the first material 120 with the first refractive index ($n_1$). The layer of the second material 200 is sandwiched between the first and second layers of the first material 100 and 120, respectively, such that a first interface 115 is defined between the first layer of the first material 100 and the layer of the second material 200, and a second interface 125 is defined between the second layer of the first material 120 and the layer of the second material 200. In one embodiment and as shown in FIGS. 6a and 6b, the first and second interfaces are each a planar interface.

A heater 130 is shown in thermal contact with at least the layer of the second material 200. The heater may be formed along only the first and the second interfaces, or over the entire device, or in other configurations that allow the thermo-optical device to function as described herein.

The first material, the second material, and the heater of this "sandwich-type" thermo-optical device and the principles by which the sandwich-type thermo-optical device operate are as described above, with reference to the embodiment shown in FIGS. 1a and 1b.

The sandwich-type thermo-optical device of FIGS. 6a and 6b may be used as either a 1×2 or as a 2×2 free-space optical switch. Used as a 1×2 free-space optical switch, the sandwich-type thermo-optical device operates in a similar manner as described above, with reference to the embodiment shown in FIGS. 1a and 1b. A light beam propagating in free-space along a first direction is incident on one of the layers of the first material 100 or 120 (shown as $\vec{I}_1$, or $\vec{I}_2$) and is transmitted through the first and second interfaces 115, 125 at a first temperature and reflected off either the first or second interface 115 or 125 at a second temperature. In one embodiment, the first interface 115 is parallel to the second interface 125.

Used as a 2×2 free-space optical switch, a first light beam propagating in free-space along a first direction (shown by $\vec{I}_1$) is incident on a first entry surface 112 of the first layer of the first material 100, and a second light beam propagating in free-space along a second direction ($\vec{I}_2$) is incident on a second entry surface 122 of the second layer of the first material 120. To reduce, and maybe even minimize, reflection of the first and second light beams off the respective entry surfaces 112, 122, in one embodiment the first light beam and the second light beam are incident normal to the first entry surface 112 and the second entry surface 122, respectively. In another embodiment, the first and second entry surfaces 112, 122 are coated with an anti-reflective coating.

In one embodiment, the first layer and the second layer of the first material are each shaped with a prism angle, α. From the geometry shown in FIG. 6b, the prism angle, α, is equal to a first angle of incidence, $\theta_1$, at which the first light beam is incident at the first interface 115 and equal to a second angle of incidence, $\theta_2$, at which the second light beam is incident at the second interface 125. As discussed previously, to get total internal reflection at the second temperature, the first and second angles of incidence, $\theta_1$ and $\theta_2$, must be greater than a critical angle, $\theta_c$, at the second temperature. Accordingly, at the second temperature, the prism angle is given by:

$$\alpha = \theta_1 = \theta_2 > \theta_c = \sin^{-1}\left(\frac{n_2}{n_1}\right).$$

The first light beam travels through the first layer of the first material 100 (as shown by $\vec{i}_1$) and is incident on the first interface 115 at the first angle of incidence, $\theta_1$. The second light beam travels through the second layer of the first material 120 ($\vec{i}_2$) and is incident on the second interface 125 at the second angle of incidence, $\theta_2$. At the first temperature, $n_2=n_1$, and both light beams are transmitted without significant refraction through both the first and the second interfaces 115, 125. In one embodiment, the first temperature is room temperature, or ambient temperature. The first and the second light beams continue to travel through the layer of the second material 200 ($\vec{t}_1$ and $\vec{t}_2$, respectively) and through the other layer of the first material, 120 or 100, respectively, along the first and second directions, respectively ($\vec{t}_1$ and $\vec{t}_2$, respectively). If the first and the second light beams hit a first and a second exit surface 132, 142 respectively, at normal incidence, then the first and the second light beams will be transmitted through the first and the second exit surfaces 132, 142, respectively, and continue to travel along the first and the second directions, respectively ($\vec{T}_1$ or $\vec{T}_2$, respectively). Thus, at the first temperature, the thermo-optical device shown in FIGS. 6a and 6b is transparent to the first and second light beams, exiting the device without having been refracted or shifted.

At the second temperature, $n_2 \neq n_1$, and at least some of the first and second light beams are respectively reflected off the first and second interfaces 115, 125 back through the first and second layers of the first material 100, 200, respectively (as shown by $\vec{r}_1$, and $\vec{r}_2$, respectively). The first and second light beams exit the device as reflected beams ($\vec{R}_1$ and $\vec{R}_2$, respectively). In this way, the thermo-optical device shown in FIGS. 6a and 6b can function as a 2×2 optical switch and/or as an optical attenuator for two light beams.

Figure 7A:
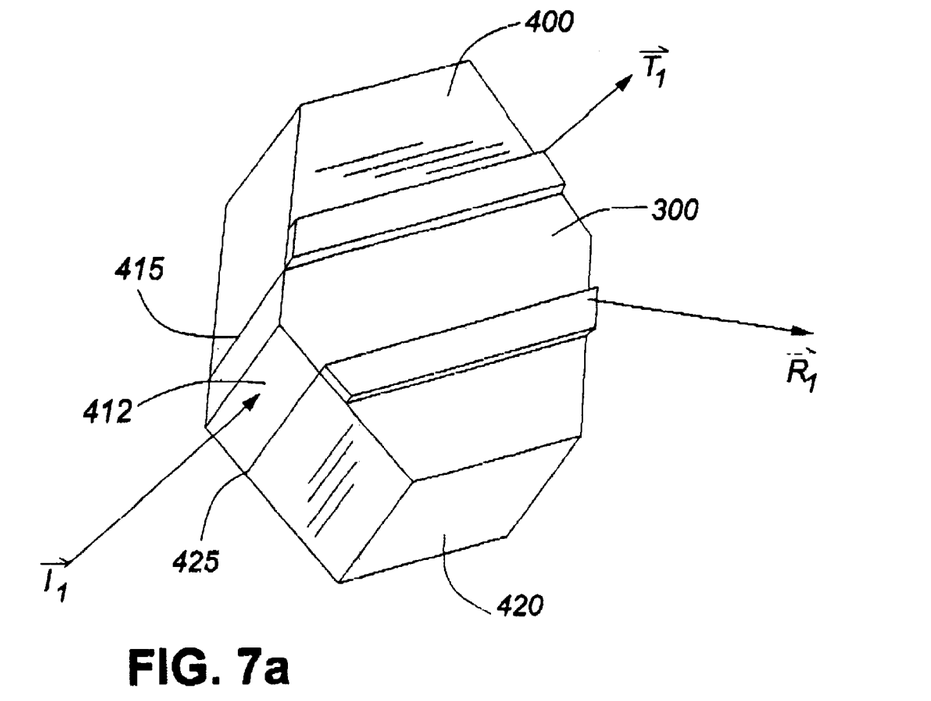
FIGS. 7a and 7b illustrate two different views of still another embodiment of a thermo-optical device.
Figure 7B:
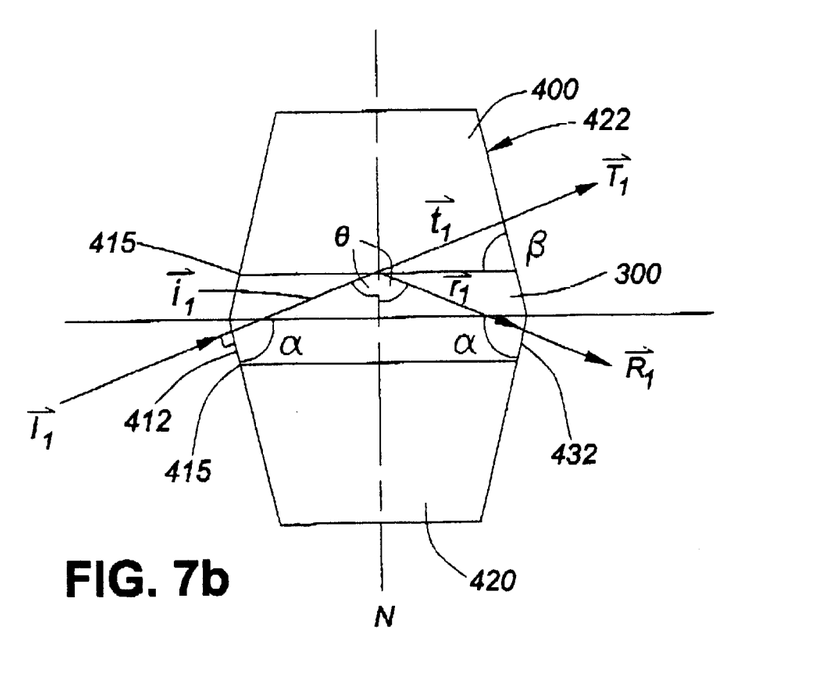

FIGS. 7a and 7b show still another "sandwich-type" embodiment of a thermo-optical device of the present invention. In this embodiment, a layer of a first material 300 having a first refractive index ($n_1$) is sandwiched between a first layer of a second material 400 and a second layer of the second material 420. The second material has a second refractive index ($n_2$) that, at a first temperature, is substantially equal to the first refractive index ($n_2=n_1$), and, at a second temperature higher than the first temperature, is different than the first refractive index ($n_2 \neq n_1$). The layer of the first material 300 defines a first interface 415 with the first layer of the second material 400 and a second interface 425 with the second layer of the second material 420. In one embodiment and as shown in FIGS. 7a and 7b, the first and second interfaces are each a planar interface.

A heater 430, shown in FIG. 7a as a pair of heating elements, is in thermal contact with at least the first layer 400 and the second layer 420 of the second material. The heater 430 is shown as only partly covering the first and second layers of the second material 400, 420, along the first and second interfaces 415, 425. The heater may have other configurations that allow the thermo-optical device to function as described herein, e.g., the heater may entirely cover the first and second layers of the second material 400, 420 and/or may contact or cover the layer of the first material 300.

The first material, the second material, and the heater and the principles by which such an embodiment would operate are similar to those described above. The use of the embodiment shown in FIGS. 7a and 7b as a 1×2 free-space optical switch will be described. From the following description, those of ordinary skill in the art will understand how to use this embodiment as a 2×2 free-space optical switch.

A light beam propagating in free-space along a first direction towards the thermo-optical device is incident on an entry surface 412 of the layer of the first material 300 (as shown by $\vec{I}_1$). To reduce, and maybe even minimize, reflection of the light beam off the entry surface 412, in one embodiment the light beam is incident on the layer of the first material 300 at an angle normal to the entry surface 412. In another embodiment, the entry surface 412 is coated with an anti-reflection coating.

In one embodiment, the layer of the first material 300 is shaped with a prism angle, $\alpha$, as shown in FIG. 7b. If the light beam hits the layer of the first material 300 normal to the entry surface 412, from Snell's Law, the light beam will not be refracted at the entry surface 412 and will propagate in the layer of the first material along the first direction (shown by $\vec{i}_1$). It can be seen from the geometry that a light beam incident normal to the entry surface 412 and propagating through the layer of the first material 300 along the first direction will be incident on the first interface 415 at an angle of incidence, $\theta$, that is equal to the prism angle, a (i.e., $\theta=\alpha$). As discussed above, for the light beam to be reflected off the interface 415 at the second temperature, the angle of incidence, $\theta$, must be greater than the critical angle, $\theta_c$, at the second temperature. Accordingly, the prism angle, $\alpha$, is given by:

$$\alpha = \theta > \theta_c = \sin^{-1}\left(\frac{n_2}{n_1}\right), \quad \text{at the second temperature.}$$

Regardless of whether the light beam is incident normal on the entry surface 412, the light beam propagates through the layer of the first material 300 and is incident on the first interface 415 at the angle, $\theta$. At the first temperature, $n_1=n_2$, and the light beam is transmitted without significant refraction through the first interface 415 and so travels through the first layer of the second material 400 along the first direction (shown by $\vec{t}_1$). In one embodiment, the first temperature is room temperature, or ambient temperature. The light beam then exits from an exit surface 422 of the first layer of the second material 400 as a transmitted beam ($\vec{T}_1$).

If the light beam is incident normal to the exit surface 422, then the light beam will exit the device along the first direction without having been refracted or shifted. From the geometry, which can be seen in FIG. 7b, it can be seen that if the first layer of the second material 400 is formed with a second prism angle, $\beta$, equal to the prism angle of the layer of the first material 300, $\alpha$, then the light beam will have normal incidence on the exit surface 422. Accordingly, in one embodiment, the thermo-optical device as shown in FIGS. 7a and 7b is configured to be transparent to the light beam at the first temperature.

At the second temperature, $n_2 \neq n_1$, and at least some of the light beam is reflected off the first interface 415 and propagates in the layer of the first material 300 along a second direction (as shown by $\vec{r}_1$). The light beam then exits the device as a reflected beam (shown by $\vec{R}_1$). In FIG. 7b, the geometry shows that the light beam propagated along the second direction in the layer of the first material 300 ($\vec{r}_1$) will be incident normal on an exit surface 432 of the layer of the first material 300. Thus, the light beam will not be refracted at the first material's exit surface 432, and the reflected beam exiting the device ($\vec{R}_1$) will continue to travel along the second direction. In this way, the thermo-optical device shown in FIGS. 7a and 7b can function as a 1×2 optical switch.

Figure 8:
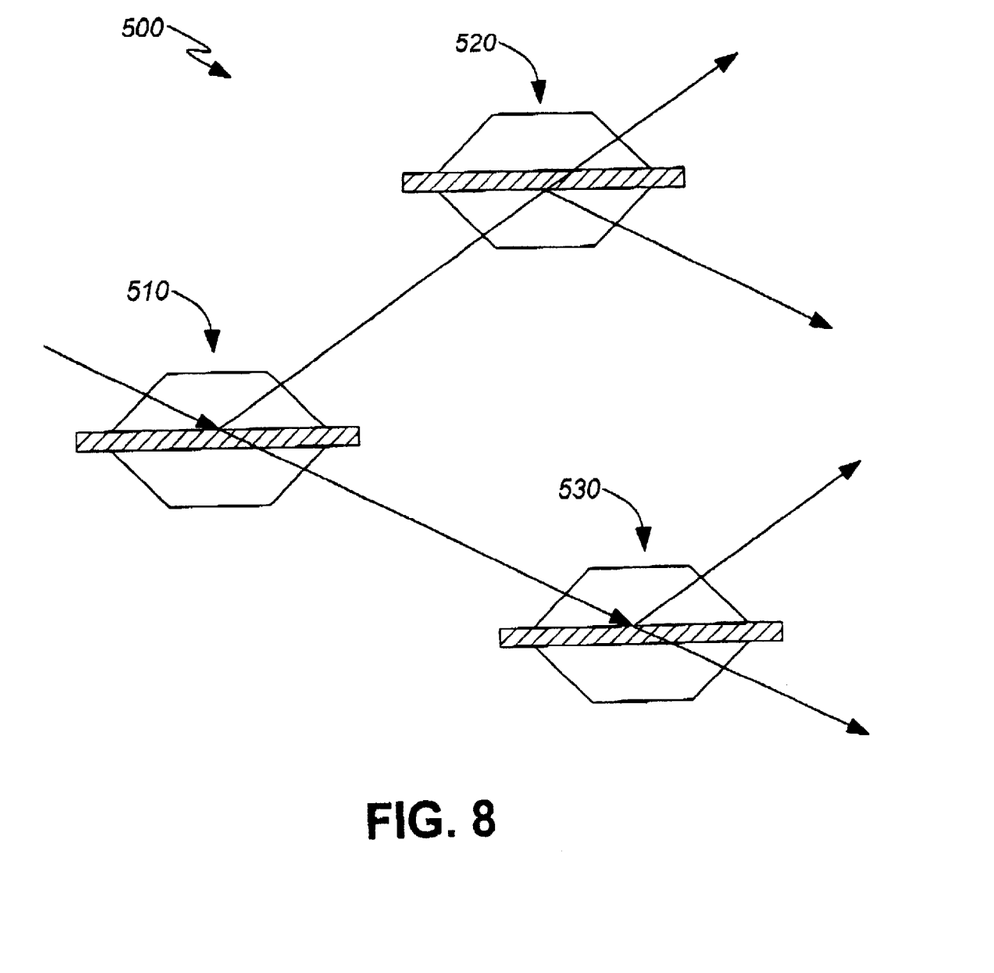
FIG. 8 shows one embodiment of a 1×4 optical switch formed by three 1×2 thermo-optical devices.

Numerous embodiments of thermo-optical devices that can be used as 1×2 and/or 2×2 free-space optical switches have been described above. Individual 1×2 and 2×2 switches may be combined in series and in parallel to form more complicated switches, such as 1×N and N×N switches. FIG. 8 shows one embodiment where three 1×2 switches 510, 520, 530 are combined in series and in parallel to form a 1×4 switch 500. Numerous other such combinations are possible to form 1×N and N×N switches. Thus, the present invention also includes 1×N and N×N free-space optical switches that are made up of a plurality of thermo-optical devices as described above.

Certain thermo-optical devices described herein provide free-space switching at millisecond switching times (kHz switching speeds). Free-space optical switches and attenuators based upon the thermo-optical devices of the present invention are expected to have low wavelength and low polarization dependencies as well as good polarization dependent loss characteristics and good operational tolerances.

Thermo-optical devices have been described with reference to certain embodiments. Those of ordinary skill in the art will recognize that numerous variations, modifications, and improvements can be made to the embodiments described above. The scope of the present invention is not limited to the above embodiments, but is defined by the claims that follow.

What is claimed is:

1. A thermo-optical device comprising:
   a first material having a first refractive index ($n_1$); and
   a second material in contact with the first material such that a planar interface between the first material and the second material is defined, the second material having a second refractive index ($n_2$), wherein at a first temperature, the second refractive index is substantially equal to the first refractive index and at a second temperature, the second refractive index is different than the first refractive index such that at the first temperature, a light beam propagated through the first material is transmitted through the interface and at the second temperature, at least some of the light beam is reflected at the planar interface.

2. The thermo-optical device as described in claim 1, wherein the first material comprises an optical glass.

3. The thermo-optical device as described in claim 1, wherein the second material comprises an optical polymer.

4. The thermo-optical device as described in claim 1, wherein the second material is selected from the group consisting of: a polymethyl methacrylate; an acrylate; and a partially halogenated acrylate.

5. The thermo-optical device as described in claim 1, wherein the second material comprises a pairwise miscible polymer.

6. The thermo-optical device as described in claim 1, wherein the second material has a thermo-optical coefficient of at least one order of magnitude different than the first material.

7. The thermo-optical device as described in claim 1, wherein the first material has a thermo-optical coefficient of not greater than $10^{-5}/°$ C.

8. The thermo-optical device as described in claim 1, wherein the second material has a thermo-optical coefficient of at least $10^{-4}/°$ C.

9. The thermo-optical device as described in claim 1, wherein, at the second temperature, the second refractive index is at least 0.001 different than the first refractive index.

10. The thermo-optical device as described in claim 1, wherein, at the first temperature, the first refractive index is between about 1.3 and about 1.6.

11. The thermo-optical device as described in claim 1, wherein the first material has a light beam entry surface that defines a first prism angle with the planar interface, the first prism angle greater than $$\theta_c = \sin^{-1}\left(\frac{n_2}{n_1}\right)$$

at the second temperature.

12. The thermo-optical device as described in claim 11, wherein the second material has a light beam exit surface that defines a second prism angle with the planar interface, the second prism angle equal to the first prism angle of the first material.

13. The thermo-optical device as described in claim 1, wherein the thermo-optical device is configured to be transparent to the light beam at the first temperature.

14. The thermo-optical device as described in claim 1 further comprising a heater in thermal contact with the thermo-optical device.

15. The thermo-optical device as described in claim 1, wherein the first material has a surface coated with an anti-reflective coating.

16. A thermo-optical device comprising:
a first layer of a first material having a first refractive index ($n_1$);
a layer of a second material having a second refractive index ($n_2$);
a second layer of the first material, the layer of the second material being sandwiched between the first and the second layers of the first material such that a first interface is defined between the first layer of the first material and the layer of the second material and a second interface is defined between the layer of the second material and the second layer of the first material,
wherein at a first temperature, the second refractive index is substantially equal to the first refractive index and at a second temperature, the second refractive index is less than the first refractive index such that at the first temperature, a light beam travelling through one of the two layers of the first material travels through at least one of the two interfaces and at the second temperature, at least some of the light beam is reflected off one of the two interfaces.

17. The thermo-optical device as described in claim 16, wherein the first interface is a planar interface.

18. The thermo-optical device as described in claim 16, wherein the second interface is a planar interface.

19. The thermo-optical device as described in claim 16, wherein the first interface is substantially parallel to the second interface.

20. The thermo-optical device as described in claim 16, wherein the thermo-optical device is transparent to the light beam at the first temperature.

21. The thermo-optical device as described in claim 16, wherein the first layer of the first material has a light beam entry surface that defines a prism angle with the first interface, the prism angle greater than $$\theta_c = \sin^{-1}\left(\frac{n_2}{n_1}\right)$$

at the second temperature.

22. The thermo-optical device as described in claim 16, wherein the second layer of the first material has a light beam entry surface that defines a prism angle with the first interface, the prism angle greater than $$\theta_c = \sin^{-1}\left(\frac{n_2}{n_1}\right)$$

at the second temperature.

23. The thermo-optical device as described in claim 16, wherein the first material comprises an optical glass.

24. The thermo-optical device as described in claim 16, wherein the second material comprises an optical polymer.

25. The thermo-optical device as described in claim 16, further comprising a heater in thermal contact with the thermo-optical device to heat the thermo-optical device at least near the first and the second interfaces.

26. The thermo-optical device as described in claim 16, wherein the first layer of the first material has a surface coated with an anti-reflective coating.

27. The thermo-optical device as described in claim 16, wherein the second layer of the first material has a surface coated with an anti-reflective coating.

28. A thermo-optical device comprising:
a layer of a first material having a first refractive index ($n_1$);
a first layer of a second material having a second refractive index ($n_2$); and
a second layer of the second material, the layer of the first material being sandwiched between the first and the second layers of the second material such that a first interface is defined between the first layer of the second material and the layer of the first material and a second interface is defined between the second layer of the second material and the layer of the first material, wherein at a first temperature, the second refractive index is equal to the first refractive index and at a second temperature, the second refractive index is different than the first refractive index such that at the first temperature, a light beam propagated through the layer of the first material is transmitted through one of the two interfaces and at the second temperature, at least some of the light beam is reflected off one of the two interfaces.

29. The thermo-optical device as described in claim 28, wherein the first interface is a planar interface.

30. The thermo-optical device as described in claim 28, wherein the second interface is a planar interface.

31. The thermo-optical device as described in claim 28, wherein the layer of the first material has a light beam entry surface that defines a prism angle with one of the two interfaces, the prism angle greater than $$\theta_c = \sin^{-1}\left(\frac{n_2}{n_1}\right)$$

at the second temperature.

32. The thermo-optical device as described in claim 31, wherein the first layer of the second material has a light beam exit surface that defines a second prism angle with one of the two interfaces, the second prism angle equal to the prism angle of the layer of the first material.

33. The thermo-optical device as described in claim 28, wherein the thermo-optical device is transparent to the light beam at the first temperature.

34. The thermo-optical device as described in claim 28, further comprising a heater in thermal contact with the thermo-optical device.

35. The thermo-optical device as described in claim 34, wherein the heater comprises a pair of heating elements to heat the thermo-optical device along at least the first and the second interfaces.

36. The thermo-optical device as described in claim 28, wherein the first material comprises an optical glass.

37. The thermo-optical device as described in claim 28, wherein the second material comprises an optical polymer.

38. The thermo-optical device as described in claim 28, wherein the layer of the first material has a surface coated with an anti-reflective coating.

39. A method of altering a light beam being propagated in free space along a first direction, the method comprising:

directing the light beam towards a surface of a first material having a first refractive index ($n_1$);

at a first temperature, propagating the light beam through the first material towards a second material, the second material being in contact with the first material such that a planar interface is defined between the first material and the second material, the second material having a second refractive index ($n_2$) that is substantially equal to the first refractive index at the first temperature, the first material and the second material having different thermo-optical coefficients; and changing the temperature from the first temperature to a second temperature such that at least some of the light beam propagating through the first material is reflected off the planar interface and is transmitted from the first material along a second direction.

40. The method as described in claim 39, wherein the light beam is incident normal to the surface of the first material.

41. The method as described in claim 39, wherein the light beam is incident with the interface at an angle greater than $$\theta_c = \sin^{-1}\left(\frac{n_2}{n_1}\right)$$

at the second temperature.

42. The method as described in claim 39, wherein the second temperature is at least 20° C. different than the first temperature.

43. The method as described in claim 39, wherein the second temperature is between about 30° and about 50° C. different than the first temperature.

44. The method as described in claim 39, wherein the second temperature is at least 40° C. different than the first temperature.

45. The method as described in claim 39, wherein the second temperature is between about 40° and about 50° C. different than the first temperature.

46. The method as described in claim 39, wherein the first temperature is an ambient temperature.

47. The method as described in claim 39, wherein changing the temperature to the second temperature results in total internal reflection of the light beam.

* * * * *

UNITED STATES PATENT AND TRADEMARK OFFICE
CERTIFICATE OF CORRECTION

PATENT NO. : 6,384,958 B1
DATED : May 7, 2002
INVENTOR(S) : Morozov

It is certified that error appears in the above-identified patent and that said Letters Patent is hereby corrected as shown below:

Column 6,
Line 42, "fib PDL is defined" should read -- PDL is defined --

Signed and Sealed this

Twenty-third Day of July, 2002

Attest:

Attesting Officer

JAMES E. ROGAN
Director of the United States Patent and Trademark Office